Figure 2:
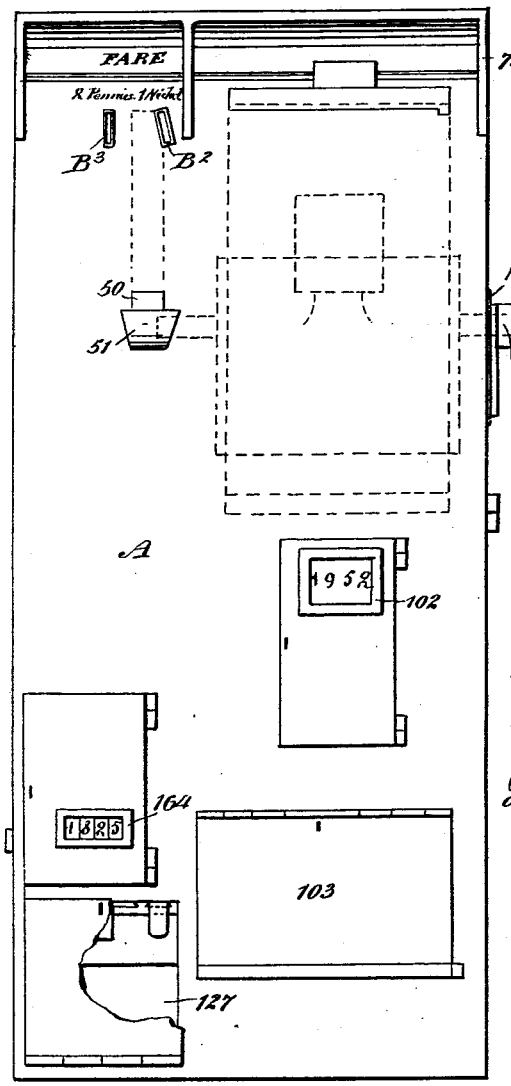

(No Model.) 11 Sheets—Sheet 1.

DETALMO DI BRAZZA SAVORGNAN.
COIN FREED LETTER POSTING OR STAMPING MACHINE.

No. 564,845. Patented July 28, 1896.

WITNESSES:
C. Neveux
C. R. Ingram

INVENTOR
Detalmo di Brazza Savorgnan
BY Munn & Co.
ATTORNEYS.

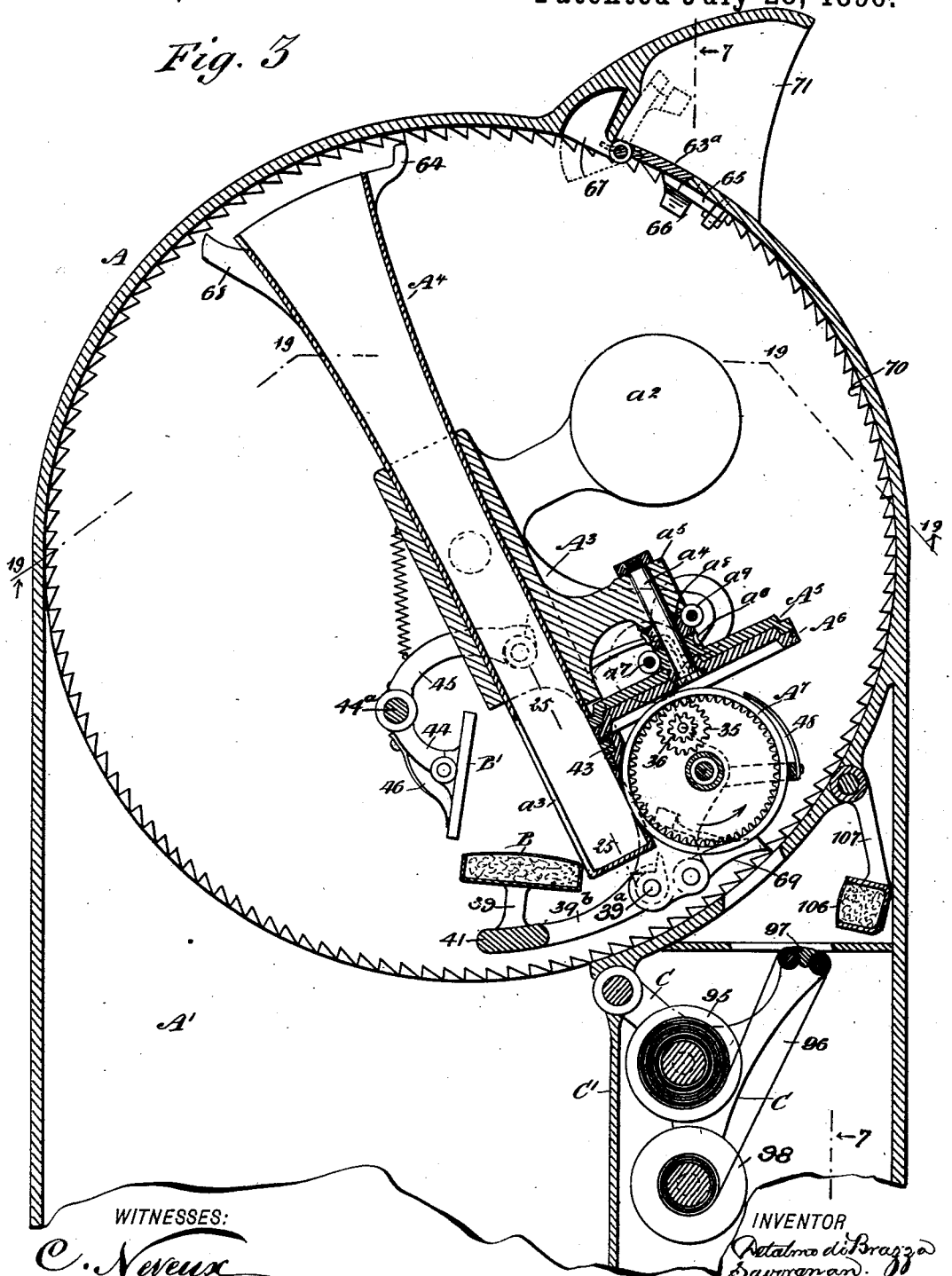

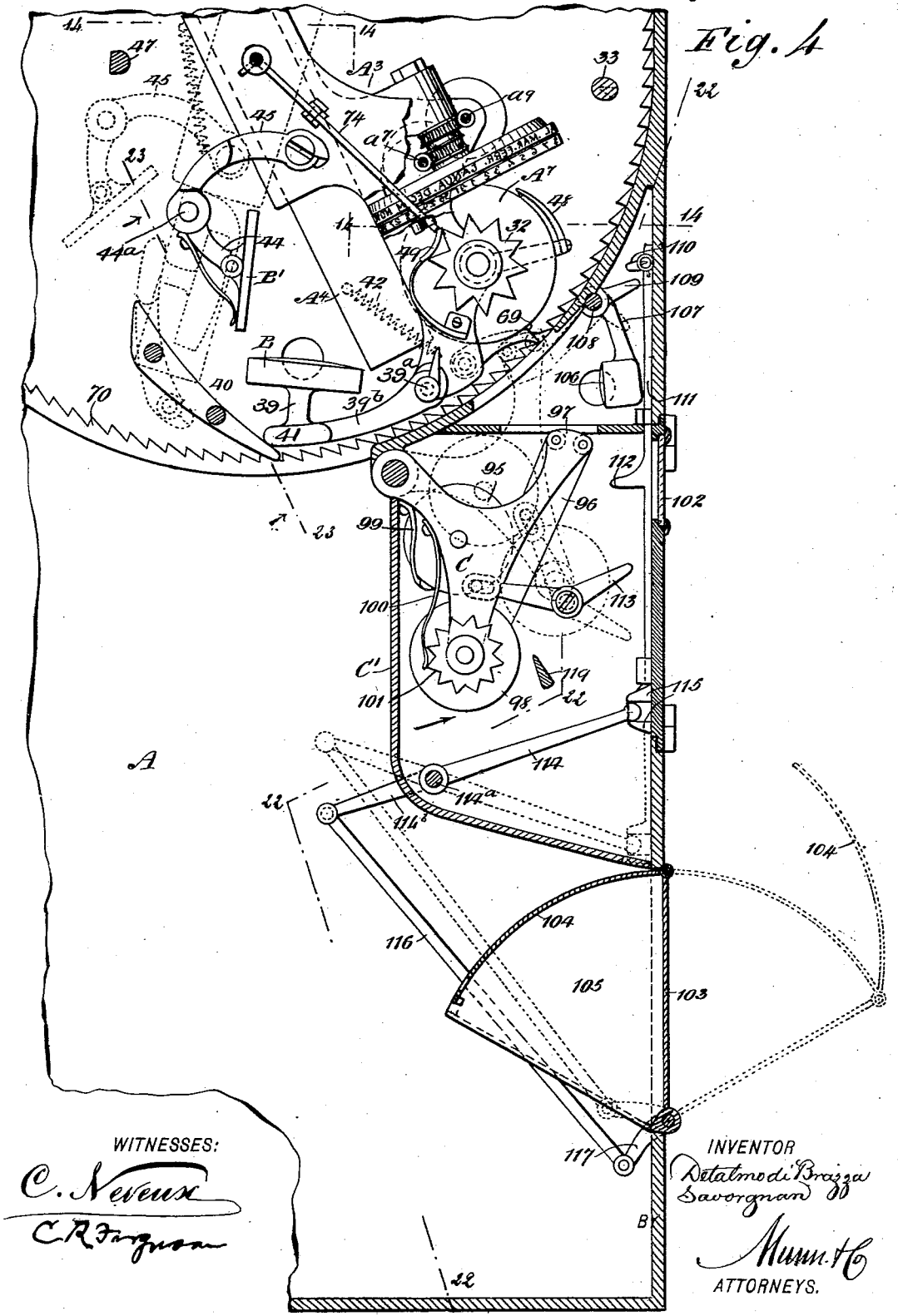

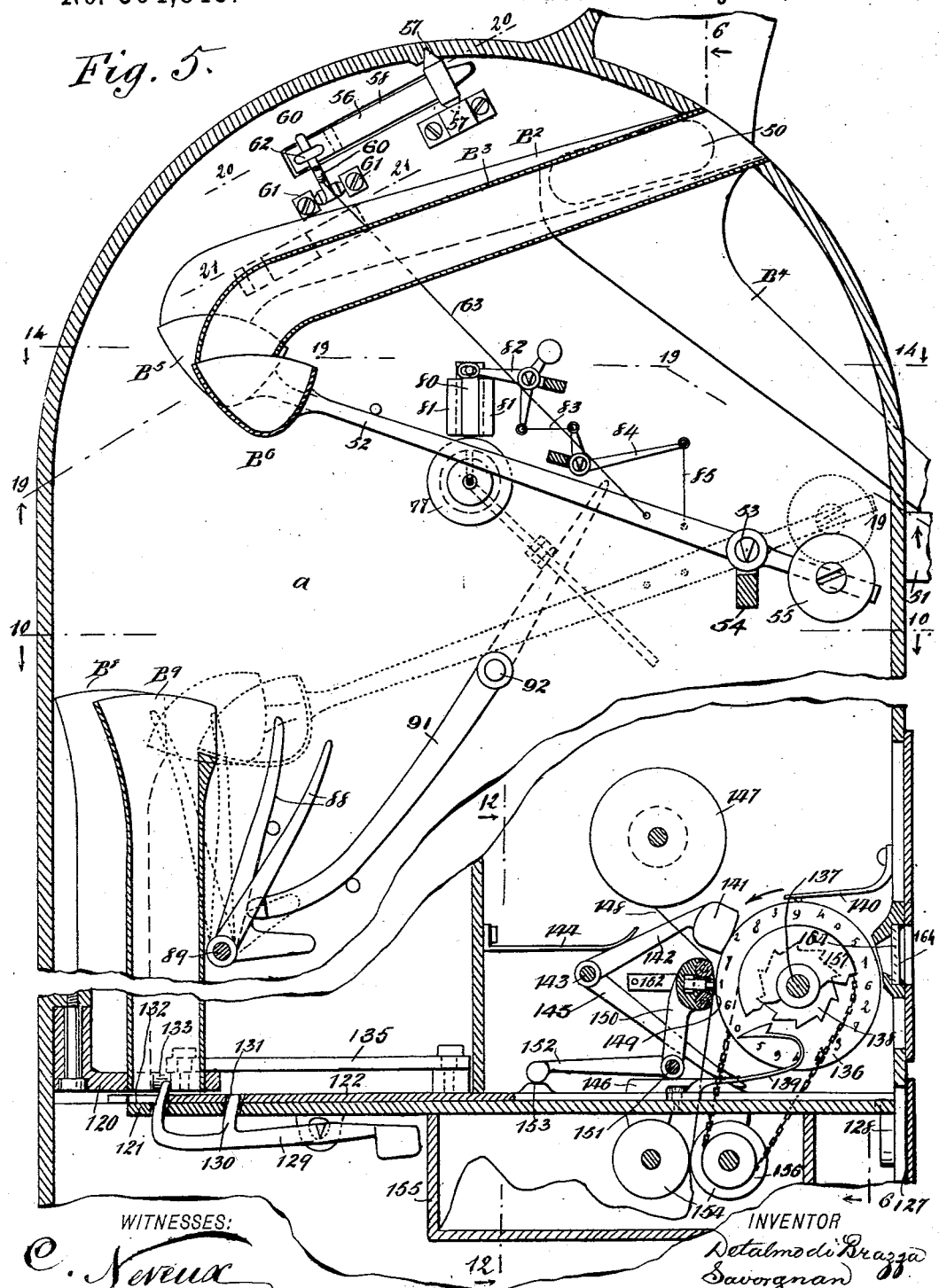

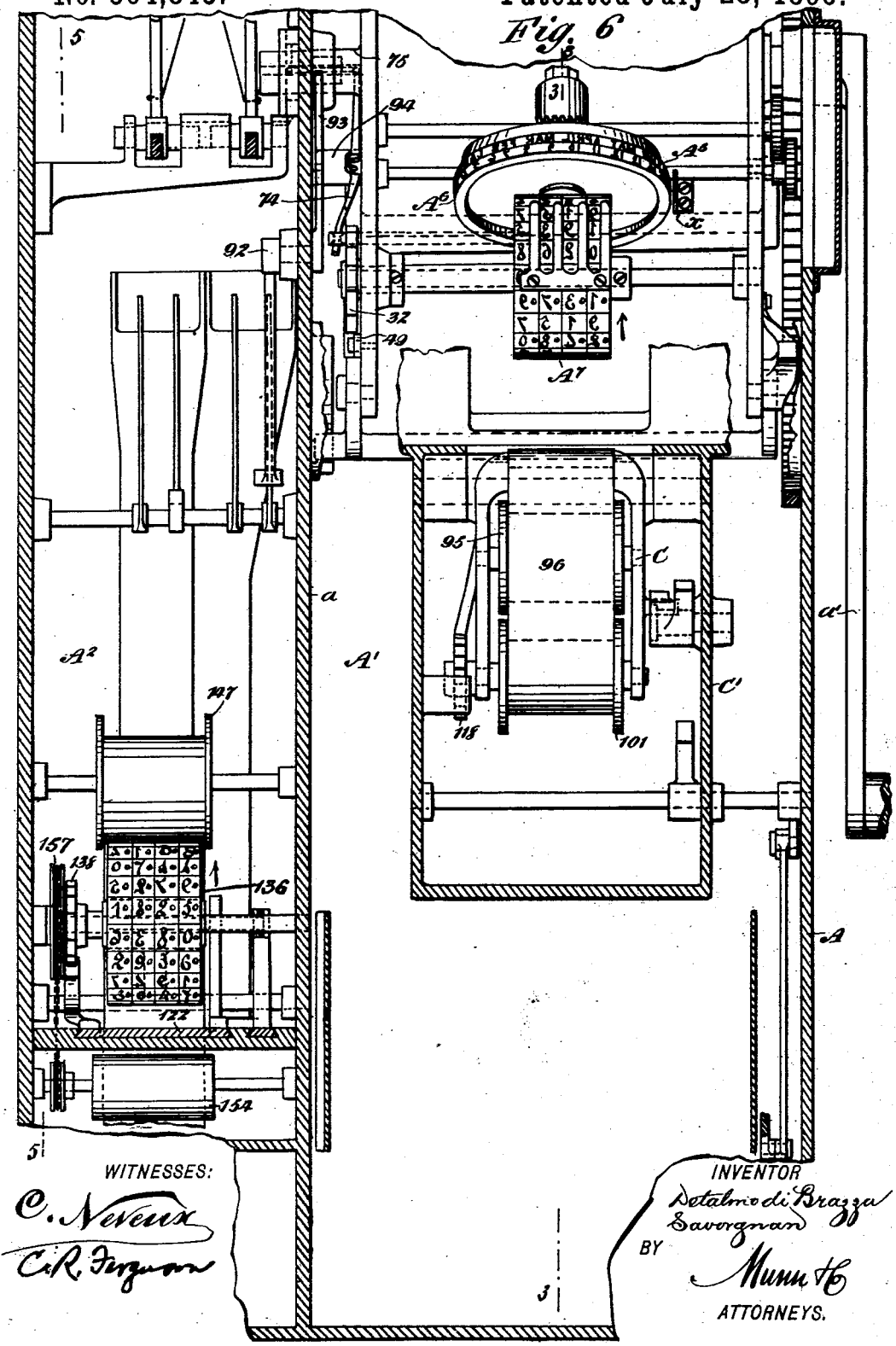

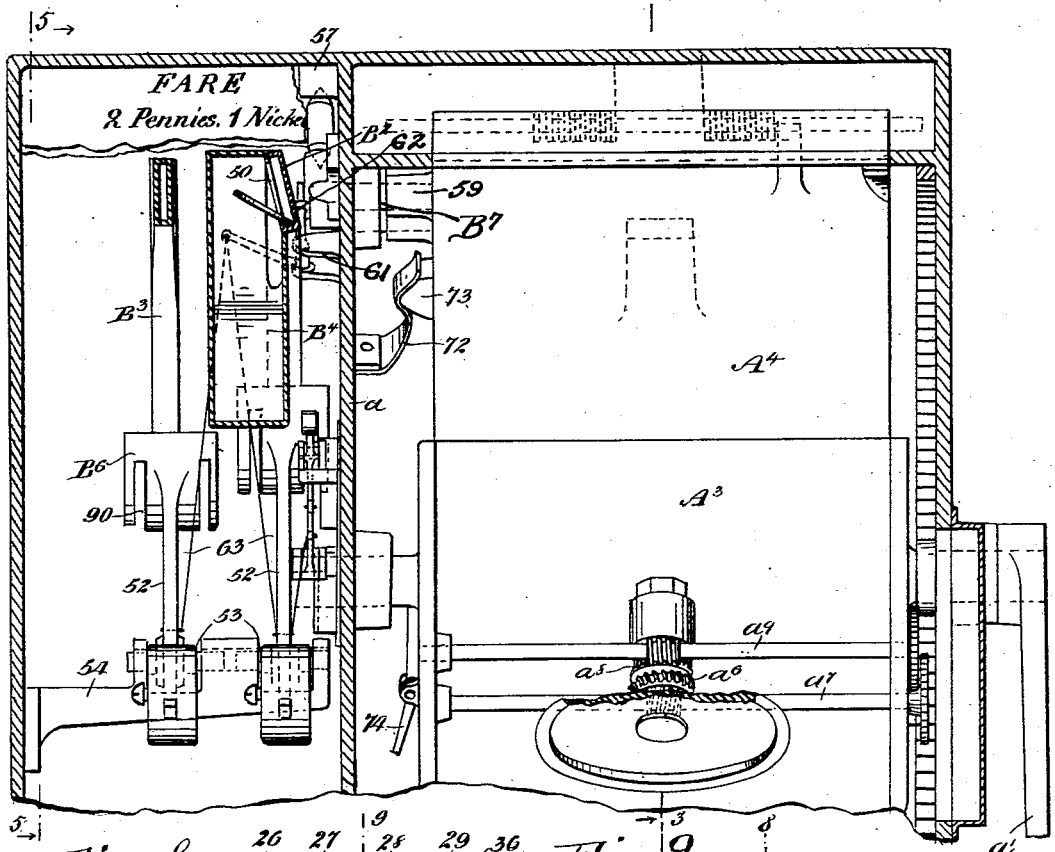

(No Model.) 11 Sheets—Sheet 7.

DETALMO DI BRAZZA SAVORGNAN.
COIN FREED LETTER POSTING OR STAMPING MACHINE.

No. 564,845. Patented July 28, 1896.

WITNESSES:
C. Neveux
C.R. Ferguson

INVENTOR
Detalmo di Brazza Savorgnan
BY
Munn & Co
ATTORNEYS.

(No Model.) 11 Sheets—Sheet 8.
DETALMO DI BRAZZA SAVORGNAN.
COIN FREED LETTER POSTING OR STAMPING MACHINE.
No. 564,845. Patented July 28, 1896.
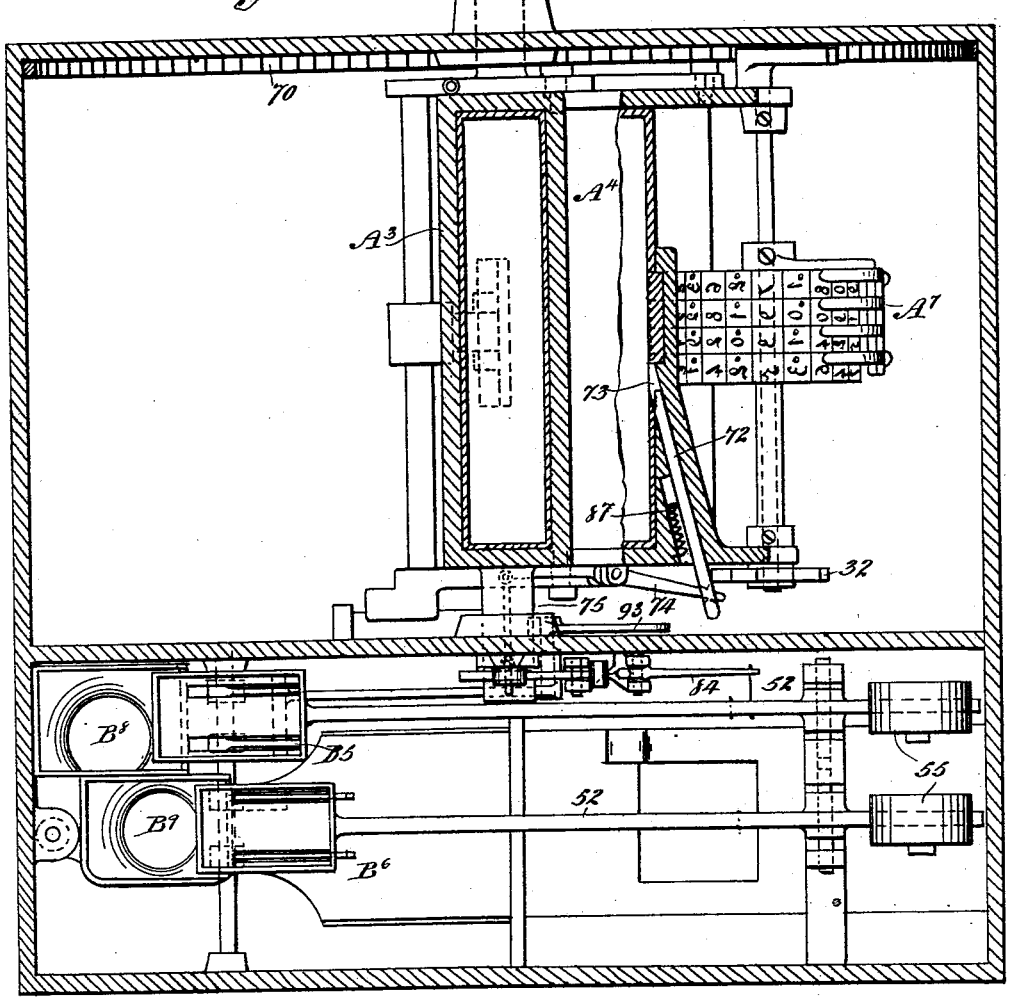
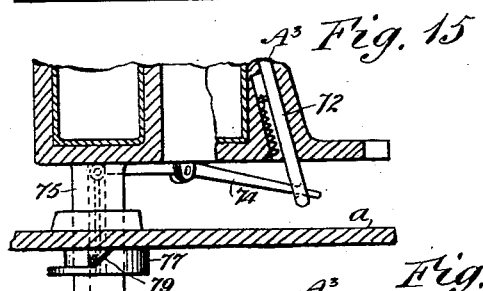
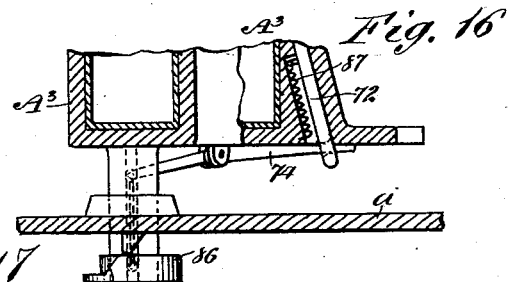
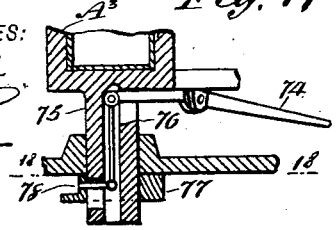
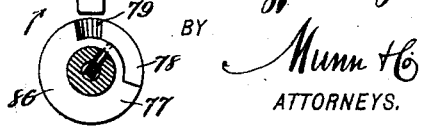
WITNESSES:
C. Neveux
C. R. Ferguson
INVENTOR
Detalmo di Brazza Savorgnan
BY
Munn & Co
ATTORNEYS.

(No Model.) 11 Sheets—Sheet 9.
DETALMO DI BRAZZA SAVORGNAN.
COIN FREED LETTER POSTING OR STAMPING MACHINE.
No. 564,845. Patented July 28, 1896.
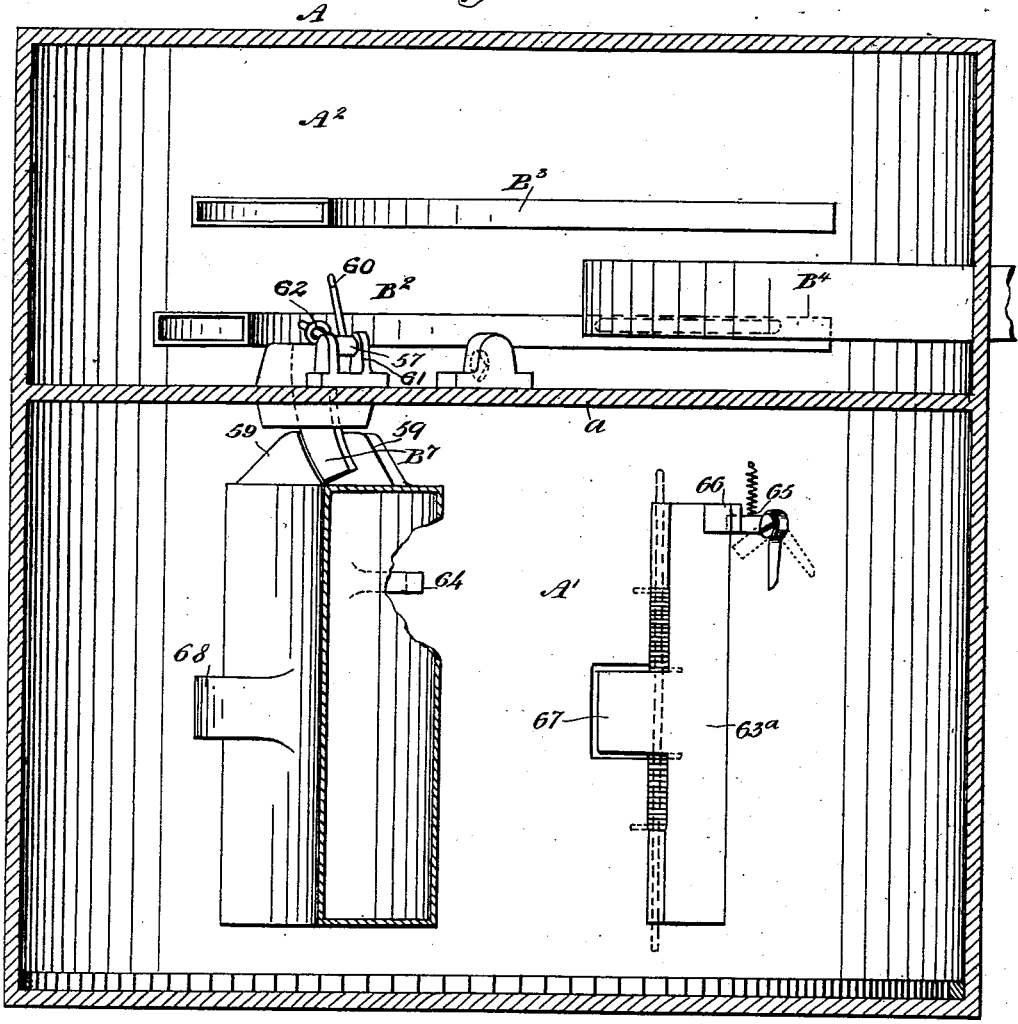
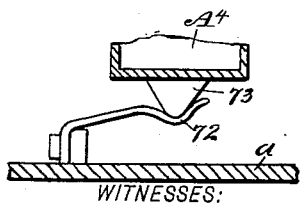
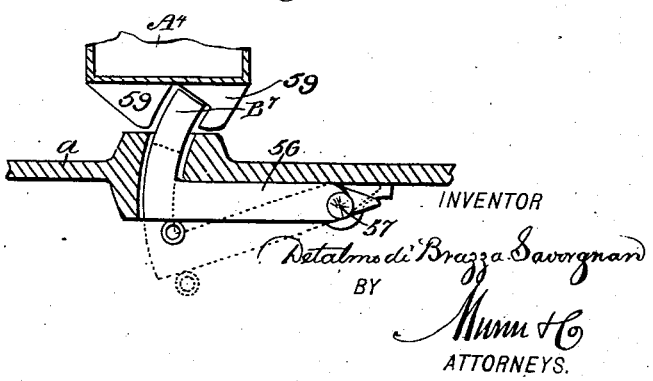

(No Model.) 11 Sheets—Sheet 10.
DETALMO DI BRAZZA SAVORGNAN.
COIN FREED LETTER POSTING OR STAMPING MACHINE.
No. 564,845. Patented July 28, 1896.
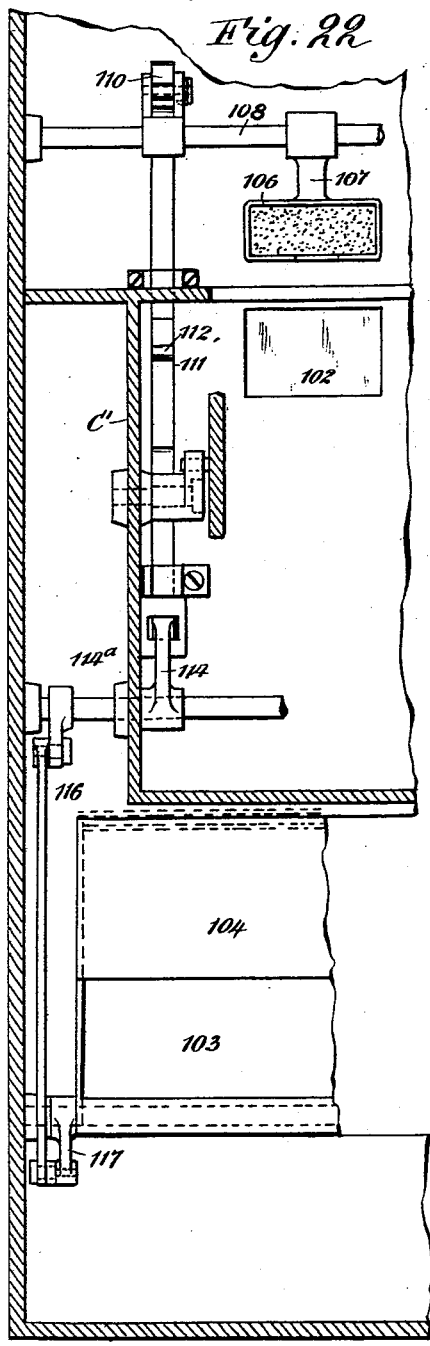
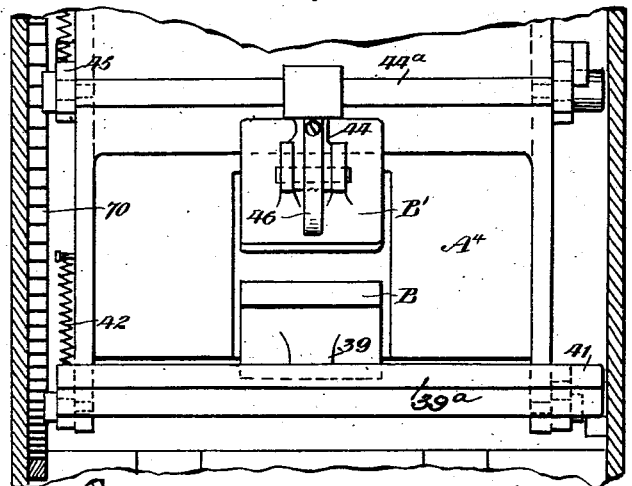
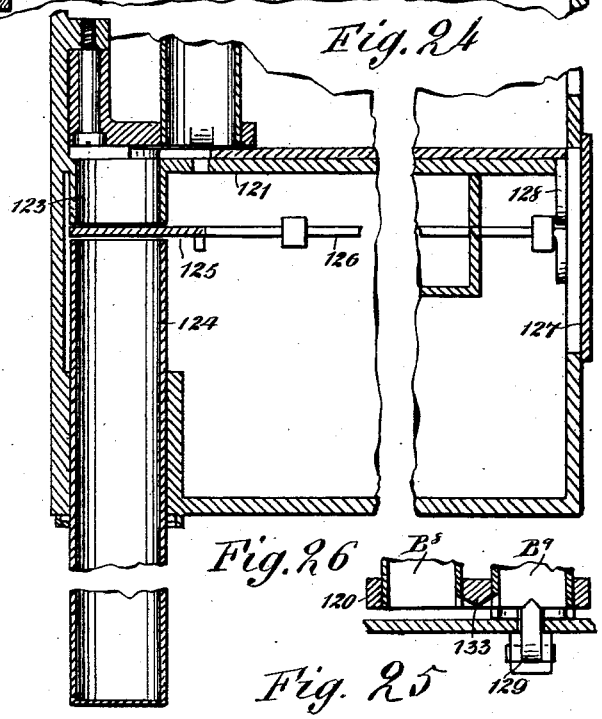
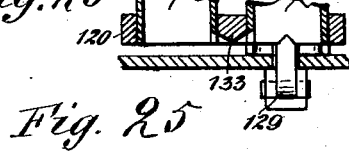
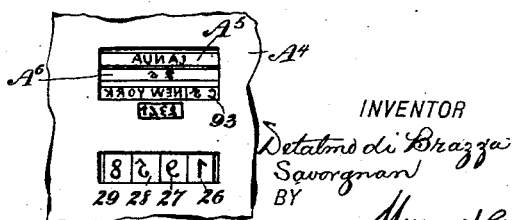
WITNESSES:
C. Neveux
C. R. Ferguson
INVENTOR
Detalmo di Brazza Savorgnan
BY
Munn & Co
ATTORNEYS.

(No Model.) 11 Sheets—Sheet 11.

DETALMO DI BRAZZA SAVORGNAN.
COIN FREED LETTER POSTING OR STAMPING MACHINE.

No. 564,845. Patented July 28, 1896.

WITNESSES:
C. Neveux
C. R. Ferguson

INVENTOR
Detalmo di Brazza Savorgnan
BY
Munn & Co
ATTORNEYS.

UNITED STATES PATENT OFFICE.

DETALMO DI BRAZZA SAVORGNAN, OF ROME, ITALY, ASSIGNOR TO CORA ANN SLOCOMB DI BRAZZA SAVORGNAN, OF MORUZZO, ITALY, AND NEW YORK, N. Y.

COIN-FREED LETTER POSTING OR STAMPING MACHINE.

SPECIFICATION forming part of Letters Patent No. 564,845, dated July 28, 1896.

Application filed August 2, 1895. Serial No. 557,984. (No model.)

*To all whom it may concern:*

Be it known that I, DETALMO DI BRAZZA SAVORGNAN, of Rome, Italy, have invented a new and Improved Coin-Freed Letter Posting or Stamping Machine, of which the following is a full, clear, and exact description.

This invention relates to letter boxes or receptacles designed to be placed in any desired locality for depositing letters to be mailed; and it comprises mechanism for progressively numbering the envelops as they are deposited and after the proper coin or coins shall have been deposited to prepay the postal fee. In this machine or depository I have embodied means for indicating on the envelop the place and date of deposit, a numeral or numerals to serve in lieu of the ordinary printed and attached stamp, and also means to designate on the envelop the amount of postage deposited therefor, whether domestic or foreign. It further embodies means for making a permanent record of the number on the last letter deposited prior to the removal of the letters by an authorized agent of the government, and also means for making a permanent record of the whole amount of coin removed from the machine by an authorized agent.

Obviously there are many advantages in a device embodying the features above enumerated, among which is the saving to a government of the cost of printed stamps, the saving in labor and machinery for the cancellation of stamps, and the reduction to a minimum of the chances for peculation.

I will describe a machine embodying my invention and then point out the novel features in the appended claims.

Reference is to be had to the accompanying drawings, forming a part of this specification, in which similar characters of reference indicate corresponding parts in all the views.

Figure 1:
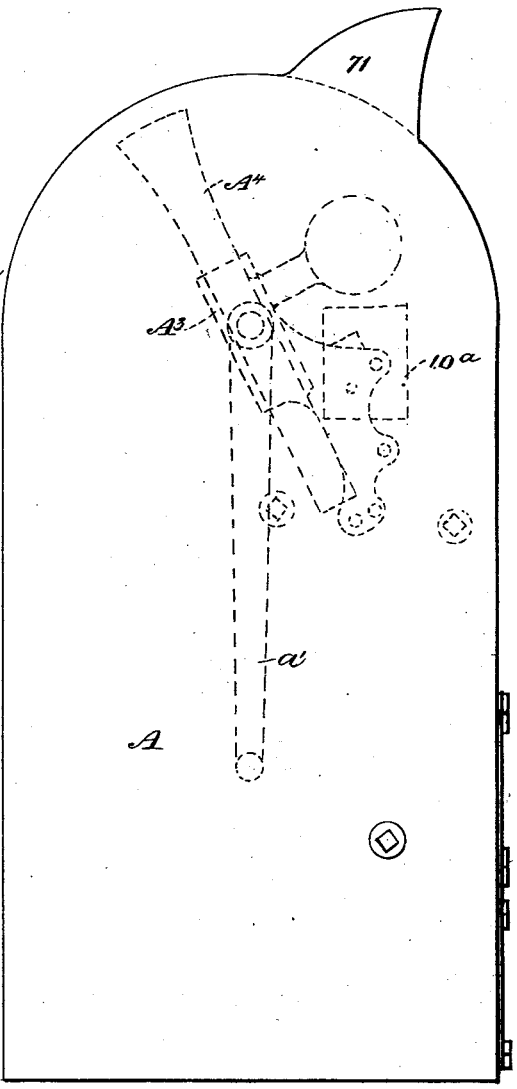
Figure 10:
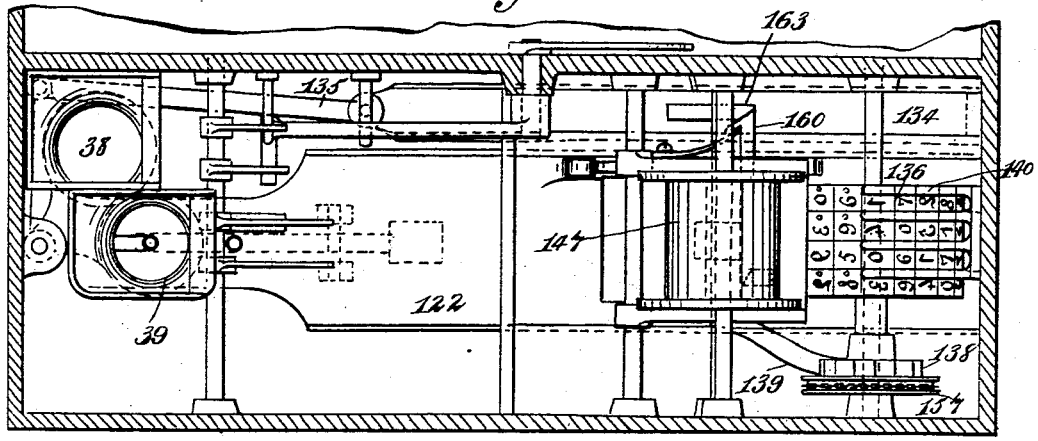
Figure 11:
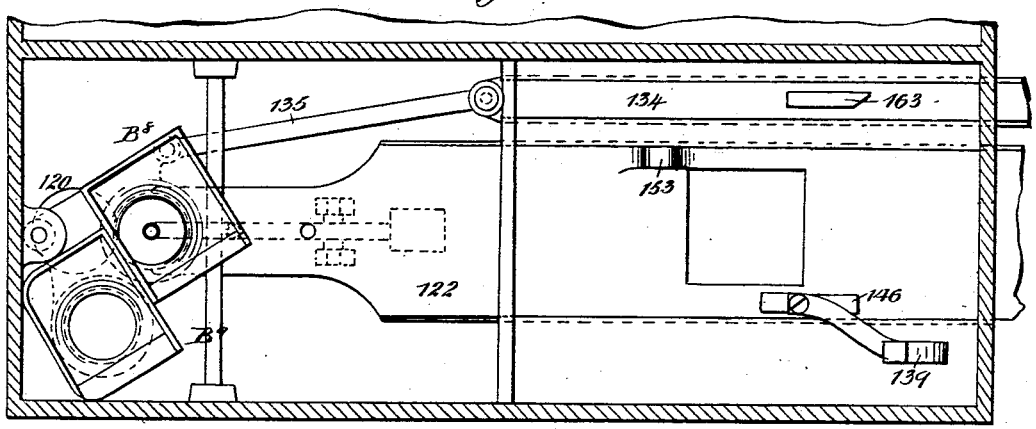
Figure 13:
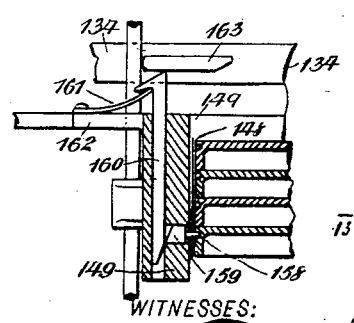
Figure 12:
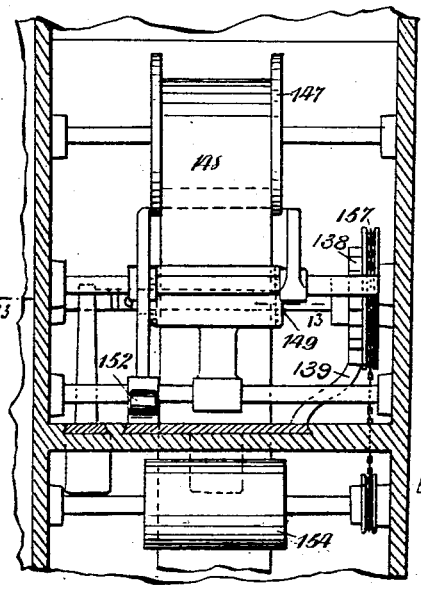
Figure 27:
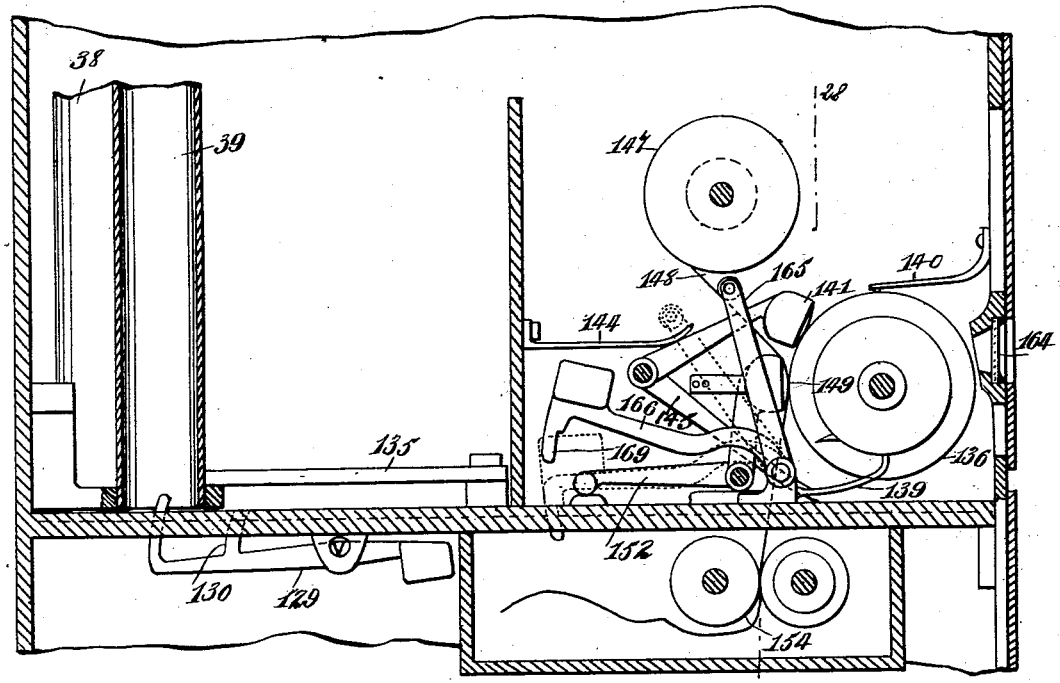
Figure 28:
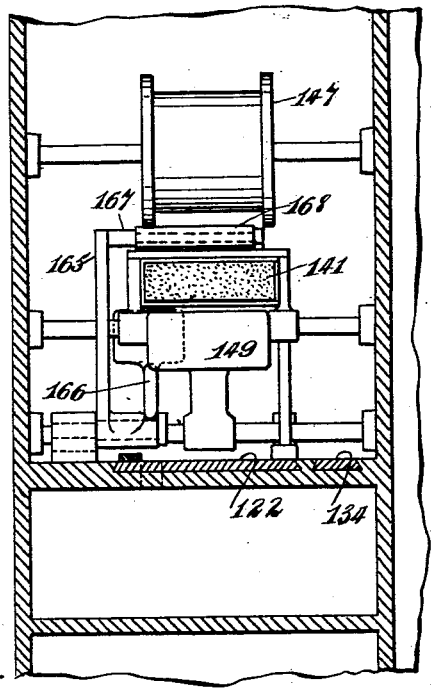

Figure 1 is a side elevation of a letter box or machine embodying my invention. Fig. 2 is a front elevation thereof. Fig. 3 is a section on the line 3 3 of Figs. 6 and 7. Fig. 4 is a vertical section of a portion of the machine. Fig. 5 is a section on the lines 5 5 of Figs. 6 and 7. Fig. 6 is a section on the line 6 6 of Fig. 5. Fig. 7 is a section on the line 7 7 of Fig. 3. Fig. 8 is a section on the line 8 8 of Fig. 9. Fig. 9 is a section on the line 9 9 of Fig. 8. Fig. 10 is a section on the line 10 10 of Fig. 5. Fig. 11 is a section similar to Fig. 10, but below the plane thereof. Fig. 12 is a section on the line 12 12 of Fig. 5. Fig. 13 is a sectional detail on the line 13 13 of Fig. 12. Fig. 14 is a horizontal section on the line 14 14 of Fig. 5. Figs. 15, 16, 17, and 18 are sectional details of a certain stamp-operating mechanism employed. Fig. 19 is a section on the line 19 19, Fig. 5. Fig. 20 is a sectional detail on the line 20 20, Fig. 5. Fig. 21 is a sectional detail on the line 21 21 of Fig. 5. Fig. 22 is a section on the line 22 22 of Fig. 4. Fig. 23 is a section on the line 23 23 of Fig. 4. Fig. 24 is a sectional detail of the lower portion of the machine. Fig. 25 is a detail on the line 25 25 of Fig. 3, showing printing devices employed. Fig. 26 is a sectional detail showing a locking device for an ejector employed. Fig. 27 is a vertical section of a portion of the device, showing a modification; and Fig. 28 is a section on the line 28 28 of Fig. 27.

Referring by reference-characters to the drawings, A designates a box or casing of suitable material and having a vertical partition $a$, forming with the walls of the casing the chambers $A'$ $A^2$.

Within the chamber $A'$ is a rotary carrier $A^3$, having a trunnion-bearing in the partition $a$ and a similar trunnion-bearing through a side wall of the casing, and the extended outer end of the last-named trunnion is provided with an operating-crank $a'$. A weight $a^2$ may be attached to one side of the carrier for forcing the carrier to its original or starting point.

Mounted on and designed to rotate with the carrier $A^3$ is a letter-receiver $A^4$, substantially of box-like form, open at one end and closed at the other end, and having an opening $a^3$ in one side through which a presser plate or platen and an inking-pad may move, as will be hereinafter described.

On the carrier $A^3$ are mounted to rotate the disks $A^5$ $A^6$ and the numbering-wheels $A^7$. The disk $A^5$ has printing-characters on its periphery indicating the months of the year, and the disk $A^6$ has on its periphery the days of the months. The disk $A^5$ is mounted to rotate on a shaft $a^4$, which rotates in a lug $a^5$, extended laterally from the carrier, and the disk $A^6$ is rigidly mounted on the end of said shaft $a^4$. The disk $A^5$ has a worm-wheel $a^6$, with which a worm-shaft $a^7$ engages, and a worm-wheel $a^8$ is rigidly mounted on the shaft $a^4$ and is in mesh with a worm-shaft $a^9$. These shafts $a^7$ $a^9$ extend to a point adjacent to the inside of the side wall of the casing, and are provided with finger-pieces by which they may be rotated. The casing is provided with a suitable door-closed opening $a^{10}$ to provide access to the shafts. Obviously by rotating the shaft $a^7$ the disk $A^5$ may be rotated to bring the proper month into operative position, and by rotating the shaft $a^9$ the disk $A^6$ may be rotated to bring the proper dating-figures into operative position, and a sight or guide plate $x$ may be provided as a means to indicate the proper position of the disk. It will be seen that the letter-receiver $A^4$ is provided with suitable openings in its side wall through which the several stamping-characters may extend.

The numbering-wheels $A^7$ are mounted on a shaft 30, rigidly connected with the framework of the carrier $A^3$, and these numbering-wheels comprise a series, as here shown, the wheel 26 for indicating units, the wheel 27 for indicating tens, the wheel 26 for indicating hundreds, and the wheel 29 for indicating thousands. The units-wheel 26 is rigidly attached to a sleeve 31, which may rotate on the shaft 30, and to the outer end of this sleeve is affixed a star-wheel 32, adapted at a certain time to contact with a lug 33, extended from the inner side of the side wall of the casing, to impart rotary motion to the wheel 26 through the space between two figures on the periphery of the wheel. Within each wheel 27 28 29 a post 34 is extended from a sleeve rigidly mounted on the shaft 30, and pivoted on each of these posts is a gear-wheel 35 and a smaller gear-wheel 36 at the side of the first-named gear-wheel. The gear-wheel 35 meshes with an annular rack 37 in the wheels, and the smaller gear-wheels 36 are adapted at a certain time to contact with a lug 38, rigidly mounted on the adjacent face of the wheel of the next lower denomination.

In operation the wheels, it will be assumed, are all set at "1." Upon one rotation of the carrier within the casing the units-wheel will be turned to present the figure "2" within the letter-receiver, for printing upon an envelop therein, and this will be continued until the said units-wheel shall have made a complete rotation, and then upon a further rotation the lug 38 thereon will engage with the wheel of the next higher denomination and rotate it one space, so as to indicate with the printing-characters that ten letters have been deposited and stamped, and this operation of course may be carried out through all of the numbering-wheels.

Each wheel is provided on its periphery with two sets of figures, ranging from "0" to "9." The figures of one set are so arranged as to present a printing-surface at the lower side of the wheels, consisting of the same numbers as those within the letter-receiver designed to be printed on the envelop. The purpose of this arrangement of figures will be hereinafter more fully described.

B is an inking-pad mounted on an arm 39, extended from a shaft $39^a$, mounted on arms $39^b$, having pivotal connection with the frame of the carrier $A^3$, and the pad is movable through the opening $a^3$ in the wall of the letter-receiver $A^4$. As a means for causing the inking-pad to move into the said receiver and supply ink to the printing devices, I provide the interior of the casing with a curved shoe 40, with which a laterally-extended arm 41 on the shaft $39^a$ may engage when the carrier is rotated, as plainly shown in full lines and indicated in dotted lines in Fig. 4. After the arm 41 shall have left the shoe 40 a spring 42 will return the inking-pad to its normal position. Fixed in a recess in the inner wall of the letter-receiver $A^4$, between the dating-disks and the numbering-wheels, is a printing device 43 for stamping on an envelop the place of mailing of the latter.

B' is a presser or platen having pivotal connection with an arm 44, extended from a shaft $44^a$, mounted on arms 45, pivotally connected with the carrier $A^3$, and a plate-spring 46, rigidly mounted on the arm 44 and bearing with its free end against the outer sides of the presser or platen B', serves to maintain the platen in a proper position with relation to the letter-receiver $A^4$ when the platen is rocked into said receiver to press an envelop against the printing-characters. As a means for moving said presser or platen into the letter-receiver, a lug 47 is extended from the wall of the casing and adapted to engage with the arm 45 as the carrier $A^3$ is rotated. It is to be understood that this movement of the platen takes place after the inking-pad B shall have resumed its normal position.

To prevent the numbering-wheels comprised in the set $A^7$ from rotating too easily or when not desired, I provide for each wheel a brake-finger 48 of resilient material and having at its free end a lug adapted to engage in a depression in the periphery of the wheel, and the star-wheel 32 may also be provided with a spring-impelled brake 49.

The normal position of the parts just described is that shown in Fig. 3, and they are locked in this position by means of a latch released therefrom by the weight of a coin inserted in the coin-operating mechanism, which I will now describe.

$B^2$ $B^3$ indicate coin-chutes located within the chamber $A^2$, and each having an outer opening through the front of the casing. These coin-chutes are inclined downward and have open inner ends. The chute B² is of a height substantially equal to the diameter of a five-cent piece or nickel and is intended to receive nickels in payment of foreign postage, and the chute B³ is of a height substantially equal to the diameter of a penny and is designed to receive pennies in payment of domestic postage. As a means for preventing the operation of the device should coin of smaller diameter than a nickel be inserted in the chute B², I arrange said chute B² at an angle transverse to its length, as plainly indicated in Fig. 7, and one wall of this chute is provided with an opening 50, which communicates with a return-chute B⁴, having an opening at the outer side of the casing above a receiver 51. Flanges at the upper and lower sides of the opening 50 will prevent the passage through said opening of a nickel, as the diameter of a five-cent piece is sufficient to engage with the upper and lower flange; but should a cent or similar coin be inserted in the chute, and as its diameter is not sufficiently great to cause it to engage with the upper flange of the opening 50, the smaller coin would drop laterally outward through the opening 50 and into the chute B⁴ to be returned to the depositor.

Coacting with the chute B² is a coin-pan B⁵, and coacting with the chute B³ is a similar coin-pan B⁶. Each coin-pan is mounted on an arm 52, and these arms 52 are fulcrumed on bearing-shafts 53, supported by a bracket 54, extended from a wall of the casing, and the projecting end of each arm 52 is provided with an adjustable counterbalance-weight 55. It will be seen that the fulcrum-points of the arms 52 are on a plane below the inner ends of the chutes B² B³, and that the weights 55 will hold the coin-pans normally against the ends of said chutes, but when a coin enters the pan it will overcome the resistance of the weight 55 and rock the pan downward to deposit the coin in the receiver, as will be hereinafter explained.

B⁷ is a locking-finger mounted on an arm 56, having pivotal bearings 57 within the casing A, and adapted to project through an opening 58 in the partition $a$ of the casing and engage between lugs 59 on one edge of the letter-receiver A⁴. To reduce friction as much as possible, the opening is made sufficiently large to clear the sides of the locking-finger B⁷, and the bearings 57 are made in the form of cone-bearings. To prevent the locking-finger B⁷ from engaging against the inner walls of the lugs 59, and thereby causing friction, I employ a spring-keeper 72, attached at one end to the partition $a$ and curved at its free end to engage the sides of the lug 73, extended from the letter-receiver A⁴. It will be seen that the arm 56 is inclined downward from its pivotal points, so that it may swing by gravity to a locking position with the lugs 59.

An angle-lever 60 has pivotal connection with lugs 61, extended inward from the partition $a$, and one arm of this angle-lever has a sliding connection through a ring 62, extended from the arm 56, and from the other arm of this lever flexible connections 63 extend to and are attached to the respective arms 52. It will be seen, therefore, that when either one of the coin-pans is moved downward by a coin the flexible connection 63 will rock the angle-lever and draw the locking-finger B⁷ out of engagement with the lugs 59, thus releasing the carrier A³ and its parts. Then by rotating the carrier by means of the crank $a'$ the other end of the letter-receiver A⁴ will first be carried to a position beneath a door or closure 63ᵃ for closing the letter-opening in the casing A. During this movement a finger 64 on the letter-receiver A⁴ will engage a projection on a latch 65, pivotally connected with the inner side of the casing and adapted to engage with a keeper 66 on the door or closure 63ᵃ, and by this engagement the latch 65 will swing out of engagement with the keeper and allow the door 63ᵃ to be impelled upward by means of a suitable spring on its hinge-pin to raise the door to the position shown in dotted lines in Fig. 3, and when in this position a block 67 on the hinged edge of the door within the casing A will be rocked into a position against a finger 68 on the side of the letter-receiver opposite the finger 64, which will prevent the carrier from being turned forward while the receiver is in position to receive a letter entered through the opening covered by the closure 63ᵃ until after the cover 63ᵃ shall have been closed. As a means for preventing a backward rotation of the carrier I provide it with a dog 69, pivoted to the frame of the carrier and held in yielding engagement by means of a spring with an annular rack 70, formed in the casing at one side.

After the deposit of a letter in the receiver A⁴ the device is rotated by means of a crank, and the envelop will be forced against the printing-characters, as heretofore described, and when the carrier shall have been rotated sufficiently far to bring the open end of the receiver A⁴ downward the letter will drop out of the receiver into a suitable receptacle in the lower part of the casing A. A hood 71 may be placed over the door 63ᵃ to prevent the entrance of snow, rain, or the like.

As a means for moving a type bearing the figure "5" into position adjacent to the fixed type 43 for the purpose of stamping the said figure "5" on a letter to indicate that an equal sum of money has been deposited to cover the postage of such letter, and to show that the letter is intended for the foreign mail, I mount said type bearing the figure "5" on a rod 72, movable through a transverse opening 73 in a portion of the carrier-frame and having a sliding engagement at its outer end with a lever 74, fulcrumed to the carrier A³, extended through a lateral opening in the inner trunnion 75 of the carrier and engaging with a link 76, movable in a longitudinal opening in said trunnion and having at its opposite end a pin engagement with a cam-wheel 77, mounted to slide longitudinally on the trunnion 75 at the end of said trunnion which projects into the chamber A². This cam-wheel 77 has a segmental groove 78, the end walls of which are inclined or beveled, as indicated at 79.

80 is a slide-plate movable vertically in guideways 81, secured to the partition $a$ immediately over the cam-wheel 77. An angle-lever 82, pivoted to a stud extended from the partition, has an elongated pivoted bearing with the slide-plate 80, and from the other arm of this angle-lever a connection 83 extends to the short arm of another fulcrumed angle-lever 84, and from the long arm of this lever 84 a flexible connection 85 extends to the arm 52 of the coin-pan B⁵, so that when said arm 52 is moved downward the lower end of the slide-plate 80 will be moved into the segmental opening 78 of the cam-wheel 77, and the rotation of said cam-wheel with the trunnion upon which it is mounted will bring its plane surface 86 in engagement with the slide-plate 80, and thus the cam-wheel will be moved longitudinally on the trunnion 75, operating the lever 74 to move the type-bearing bar 72 inward to bring its type into printing position, and after this printing the bar 72 will be moved outward by means of a spring 87.

I will now describe means for ejecting coin from the coin-pans when they are moved downward by the coin, with their open ends communicating with the coin-tubes B⁸ B⁹ of the respective pans B⁵ B⁶. This means consists of fingers 88, mounted on a rock-shaft 89 and movable through slot-openings 90 in the lower sides of the coin-pans. With one of these fingers 88 the lower end of a lever 91 engages, the upper end of said lever 91 being attached to a shaft 92, extending through the partition $a$ and having an arm or lever 93 within the chamber A' adapted to be engaged by a lug 94, extended from the carrier A³. Obviously when the said projection 94 engages with the lever 93 the lever 91 will be rocked to rock the fingers 88 to force a coin out of the pans, as indicated in dotted lines in Fig. 5.

I will now describe means for registering or recording on a strip of paper or similar material the number imprinted on the envelop containing the letter last deposited.

C designates a swinging frame mounted in a boxing C', secured to the inside of the front wall of the casing A immediately below the printing-wheels comprising the set A⁷. This frame C has journaled in it a drum 95, serving as a delivery-drum for a tape of paper or similar material 96, which extends from said drum over a platen 97, having idler-rollers at its side, and thence to a take-up drum 98, also having journal-bearings in said frame C. A brake or retarding device, consisting of a spring-arm 99, extends from a portion of the frame C, and bears with its free end upon the flange or end of the drum 95, and a spring-arm or retarding device 100, extended from a portion of the frame C and engaging with a star-wheel 101 on the shaft of the drum 98, serves as a brake for said drum 98.

It is designed to move the paper 96 or its portion over the platen 97 against the type or printing-characters on the lower side of the wheels comprising the set A⁷ corresponding to the numbers which are at this time within the letter-receiver A⁴, so as to indicate the number printed on the letter last deposited, and when the said paper is carried by its supporting-frame downward the number printed thereon may be seen through a glass-covered sight-opening 102 in the front of the casing A. The necessary upward movement of the frame C is caused by the opening of a door 103, closing an opening in the front of the casing and through which the letters are to be taken from the casing or box.

Pivotally connected with the upper edge of the door 103 is a transversely-curved plate 104, which, when the door is closed, bears upon the upper edges of the end pieces 105, carried by the door, and bearing at its upper side against the upper wall of the opening for which the door 103 is designed. As the door 103 is moved outward or downward on its hinge the plate 104 will prevent the introduction of a person's hand to remove letters until the said door 103 shall have been moved a sufficient distance to allow the inner or free edge of the plate 104 to clear the upper wall of the opening, and then a suitable spring coiled about the hinge between the parts 103 and 104 will force the plate 104 upward to the position indicated in dotted lines in Fig. 4, so that an authorized person may insert his hand into the box to remove letters, and it is at this time that the platen 97 is moved against the numbering-wheels, as hereinbefore mentioned.

During the opening of the door, and before it has reached the limit of its movement, an inking-pad 106 will be moved into contact with the numbers on the lower side of the numbering-wheels. This pad is mounted on an arm 107, extended from a rock-shaft 108, and a finger 109 is extended from said rock-shaft into the line of movement of a yielding lug 110 on a vertically-moving rod 111, movable in guideways affixed to the inner side of the front wall of the casing A. A portion of the rod 111 within the boxing C' has a projection 112, adapted to engage with one arm of a fulcrumed lever 113. The other arm of said lever 113 has a sliding pivotal connection with the frame C, and a lever 114, extended from a rock-shaft 114ᵃ, fulcrumed in the boxing C', has one end slidably connected between lugs 115 on the bar 111. From the shaft 114ᵃ a lever 114ᵇ extends, and this lever 114ᵇ has a link connection 116 with an arm 117, extended from the lower portion of the door 103. It will therefore be seen that when the door 103 is opened the bar 111 will be moved downward, causing first the finger 110 to rock the inking-pad 106 against the face of the type on the numbering-wheels, and after the finger 110 shall have passed the projection 109 the inking-pad will fall back by gravity, and then the projection 112 will engage the lever 113, rocking it on its fulcrum and causing the frame C to move upward to engage the tape with the figures on the numbering-wheels, as indicated in dotted lines in Fig. 4, and during this upward movement one of the teeth on the wheel 101 will engage a fixed lug 119, which will cause the drum 98 to rotate and feed the paper a short distance with relation to the platen 97.

I will now describe means for removing a coin from the tubes $B^8$ $B^9$ and means for registering or recording the number of coins ejected one at a time from said tubes. The tubes $B^8$ $B^9$ are both mounted on a pivoted plate 120, so that the tube $B^8$ may be moved over a plate 121, over which an ejector 122 operates. It may be here stated that the normal position of the tube $B^9$ is over this plate 121, and the tube $B^8$ at one side thereof, as indicated in Fig. 10. At the inner end of the plate 121 and beyond the lower opening of the tube $B^9$ is a tubular outlet 123, adapted to register with a receiving-tube 124, adapted to be inserted through an opening in the bottom of the casing A, as indicated in Fig. 24. A suitable cover may be provided for the opening through which the tube 124 is designed to extend, and the lower end of the outlet 123 is provided with a closure in the form of a sliding plate 125, having a stem 126 extended through suitable guides to the front portion of the machine, where it is provided with a handpiece that may be grasped upon opening a door 127, normally locked to close an opening in the front portion of the casing.

The ejector-plate 122 extends the full length of the plate 121, and has at its forward end a handle 128, which may also be grasped to operate the ejector when the door 127 is opened. The said plate must be returned to its inward normal position before the door can be closed.

I provide a locking device for the ejector-plate, which will prevent the outward movement of said plate after all the coin shall have been removed from the coin-tube over the same. This locking device consists of a counterbalanced fulcrumed lever 129, having a finger 130 projecting through an opening in the plate 121 and designed to enter a hole 131 in the ejector-plate. The end of the lever 129 is turned upward and normally projects through an opening in the plate 121 and through a slot 132, formed longitudinally in the ejector-plate and opening outward through the end of the same.

In operation the weight of the coin will hold the upper end of said curved end of the lever 129 flush with the upper surface of the ejector-plate and the finger 130 below the plane of the ejector-plate, and therefore out of the opening 131; but when there is no coin in the tube to counterbalance the weight on the opposite end of the lever the upturned end of the said lever will project above the plane of the ejector-plate and allow the finger 130 to enter the hole or opening 131, thus preventing the outward movement of the ejector-plate and indicating to the person removing the money that all of the coin has been removed from the tube.

After all the pennies have been removed from the tube $B^9$ the tube $B^8$ is moved into position over the plate 121 and the ejector, and to allow this movement a lug 133, projected downward from the plate 120 between the tubes and having inclined sides, will engage against the upturned end of the lever 129 and force the same downward, thus allowing the tube $B^8$ to be moved into position. As a means for moving the tube $B^8$ to the desired position, I employ a sliding bar 134, projected outward and having a handle which may be reached upon opening the door 127, and having pivotally connected to its inner end a link 135, which has pivotal connection with the plate 120 at one side of the tube $B^8$.

To cause the registering of the number of coins removed from the tubes, I employ a set of numbering-wheels 136, constructed similarly to the numbering-wheels comprised in the set $A^7$ hereinbefore described and numbered in the same manner on their peripheries. These numbering-wheels 136 are mounted on a shaft 137, extended transversely in the casing A, and the sleeve of the units-wheel carries a ratchet-wheel 138, adapted to be engaged by a yielding dog 139, attached to the ejector-plate 122. The wheels 136 have resilient retarding devices 140 similar to the retarding devices of the wheels comprised in the set $A^7$.

141 is an inking-pad mounted on an arm 142, extended from a rock-shaft 143 and pressed against the numbering-type by means of a plate-spring 144, attached to a fixed part of the casing and bearing on said arm 142. From the rock-shaft 143 an arm 145 extends downward and is designed to be engaged at its end with a lug 146 on the upper side of the ejector-plate, so that by an outward movement of said ejector-plate the rock-shaft will be rocked to carry the inking-pad away from the wheels.

From a delivery-roller 147 a paper strip 148 extends over a movable platen 149 on the upper end of an arm 150, which extends upward from a rock-shaft 151, and from this rock-shaft an arm 152 extends with its end in the line of movement of a cam-lug 153 on the ejector-plate. From the platen 149 the paper strip 148 extends downward between rotary feed-rollers 154, journaled in a boxing 155, secured below the plate 121, and rotary motion is imparted to these feed-rollers by means of a band-chain extended from a pulley 156 on the journal of one of said feed-rollers and extended around a pulley 157, mounted on a sleeve to which the ratchet-wheel 138 is attached.

The amounts printed on the tape 148 in the manner above described are supposed to indicate the number of pennies removed from the tube B⁹, but when the tube B⁹ shall have been emptied and it is desired to empty the tube B⁸ of its nickels means must be provided to indicate on the tape 148 that nickels are intended to be registered on the tape. For this purpose I employ a puncturing device designed to puncture the paper at one end of the row of figures printed and at the same time said figures are printed. This puncturing device consists of a pin 158, extended from a block 159, moved transversely in an opening formed in the platen 149. At its inner end this block 159 is beveled, as plainly shown in Fig. 13, and the beveled end of a plunger 160, adapted to slide in a longitudinal opening formed in the platen, will engage with the beveled end of the said block. The outer end of the plunger 160 is beveled inward and rearward and is held in a normally outward position by means of a spring 161, mounted on an arm 162, extended from the platen 149. The outer beveled end of the plunger 160 lies normally against the cam-shaped end of a lug 163 on the upper side of the sliding bar 134. When the said bar 134 is moved outward to shift the coin-tube B⁸ into position for discharging its coin, the plunger 160 will be forced inward, and the impinging of said plunger against the block 159 will force the pin outward through a perforation in the platen, so that when said platen with the strip of paper is forced up against the printing-characters the said pin will perforate the paper at the end of said line of characters.

It will be seen that when certain figures of one line on the wheels are in position for printing, the corresponding figures in the other line will be opposite a sight-opening 164 in the front part of the casing, so that note may be taken of said figures to verify the number of coins removed by an authorized party.

In Figs. 27 and 28 I have shown means for automatically locking the ejector-plate 122 when the paper strip 148 is wholly unwound from the roller 147. This means consists of a fulcrumed angle-lever having an upwardly-extending arm 165 and a horizontally-extended arm 166. Extended from the upper end of the arm 165 is a shaft 167, on which is mounted a roller 168, adapted to bear on the front side of the paper strip between the roller 147 and the platen 149. The arm 166 is weighted at its end and is provided with a finger 169, adapted to engage in a hole in the ejector-plate. The paper normally holds the arm 166 in the position shown in full line in Fig. 27, but should the strip terminate or be broken between the roller 147 and the platen 149 the angle-lever will rock on its pivot and the finger 169 will engage in the hole in the plate 122 and lock the same, thus preventing its withdrawal until a new strip of paper shall have been placed on the roller.

Having thus described my invention, I claim as new and desire to secure by Letters Patent—

1. A letter posting and stamping machine, comprising a casing, a rotary carrier therein, a letter-receiver supported by said carrier, a progressive-numbering mechanism carried by said carrier, printing-characters rigidly attached to said carrier, means for inking the printing-characters, and means for forcing the article to be printed against the printing-characters, substantially as specified.

2. A letter posting and stamping machine, comprising a casing, a rotary carrier therein, a letter-receiver supported by said carrier, a progressive-numbering device supported by said carrier, an inking device carried by the carrier, a presser-plate and means for moving the inking device into contact with the printing-characters when the carrier is rotated, substantially as specified.

3. A letter posting and stamping machine, comprising a casing, a rotary carrier therein, a letter-receiver supported by said carrier, progressive-numbering wheels carried by the carrier, an inking device, and a presser-plate carried by the carrier, substantially as specified.

4. A letter posting and stamping machine, comprising a casing having an opening for the insertion of letters, a cover for said opening, a locking device for the cover, a rotary carrier and letter-receiver carried thereby, and adapted to engage with the locking device of the cover, for releasing the same, and also having means for engaging with a portion of said cover to prevent a forward movement of the carrier, substantially as specified.

5. A letter posting and stamping machine, comprising a casing having an opening for the insertion of letters, a spring-impelled door for said opening, a locking-latch for said door, a rotary carrier in the casing, a letter-receiver carried thereby and adapted to release the locking device from the door by contacting therewith, and printing devices carried by the carrier, substantially as specified.

6. A letter posting or stamping machine, comprising a casing, a carrier mounted therein, exterior means for rotating said carrier, a letter-receiver supported by the carrier and comprising a receptacle open at one end and having a lateral opening in its opposite end, a series of numbering-wheels carried by the carrier and having a portion projected through an opening in the letter-receiver, dating-disks carried by the carrier and also having portions extending through an opening in the letter-receiver, an inking-pad movable through the lateral opening in the letter-receiver, means for causing said movement of the inking-pad as the carrier is rotated, a presser-plate also movable through said lateral opening, and means for causing the movement of said presser-plate as the carrier is rotated, substantially as specified.

7. A letter posting and stamping machine, comprising a casing, a rotary carrier therein, a coin-freed mechanism for releasing the same, a letter-receiver supported by said carrier, and the printing or numbering devices carried by said carrier, substantially as specified.

8. A letter posting and stamping machine, comprising a casing, a rotary carrier therein, a letter-receiver supported by said carrier, printing-indices carried by said carrier, an inking device carried thereby, a presser-plate carried by said carrier, a latch connection with said carrier, and a coin-receiver adapted with the weight of a coin to release said latch, substantially as specified.

9. In a machine of the character described, a casing, a rotary carrier therein, coin-actuated mechanism for releasing the same, a door normally closing an opening in the casing, a locking device for said door adapted to be released by the movement of the carrier, printing devices carried by the carrier, comprising a series of numbering-disks and dating-disks, an inking-pad carried by the carrier, a fixed part adapted to move the inking-pad from the contact of the printing devices as the carrier is rotated, and a presser-plate movable toward the printing devices, substantially as specified.

10. A letter posting and stamping machine, comprising a casing, a rotary carrier therein, a letter-receiver carried by said carrier, printing devices carried by the carrier, a printing-platen movable into engagement with certain of said printing devices, and mechanism for causing said movement, substantially as specified.

11. A letter posting and stamping machine, comprising a casing, a rotary carrier therein, a letter-receiver supported by said carrier, a progressive-numbering device carried by the carrier, a swinging frame, a platen on the said frame movable into engagement with the printing devices, and mechanism between said swinging frame and a door of the casing whereby the platen of said frame is moved into engagement with the printing devices upon the opening of the door, substantially as specified.

12. A letter posting or stamping machine, comprising a casing, a rotary carrier therein, a letter-receiver carried by said carrier, a series of numbering-wheels carried by the carrier, each of said wheels having two series of figures on its periphery arranged in different order, one of said series being adapted to print upon an envelop within the receiver and the other series being adapted to print upon a strip movable into engagement therewith, substantially as specified.

13. The combination with the casing, a rotary carrier therein, a letter-receiver and the progressive-numbering wheels, of the swinging frame located beneath the same and carrying a platen, a feed-roller and a take-up roller in said frame, an inking device, a vertically-movable rod, and connections between said rod and the door of the casing whereby upon the opening of the door the inking-pad will be first contacted with the printing-numbers and then the said frame swung upon its pivots to force the platen or tape thereon against said figures, substantially as specified.

14. A letter posting or stamping machine, comprising a casing, a rotary carrier therein, a letter-receiver supported thereby, printing devices carried by the carrier, an annular rack within the casing, and a spring-impelled dog pivoted on the carrier and adapted to engage the said rack, substantially as specified.

15. For use in a letter posting or stamping machine, a numbering device comprising a rotary disk supported by a sleeve having rotary motion on a fixed shaft, another rotary disk having an interior annular rack, a gear-wheel within the said disk, supported by an arm rigidly extended from the shaft and engaging with the rack, another gear connected with the first-named gear, and a lug on the disk of lower denomination to engage with said other gear, substantially as specified.

16. The combination with a casing, a rotary carrier therein, a letter-receiver carried by said carrier, lugs extended from said receiver, a locking-latch extended between said lugs, means for normally holding the said latch out of engagement with said lugs when between the same, and coin-actuated mechanism for operating the said latch, substantially as specified.

17. A letter posting or stamping machine, comprising a casing, a rotary carrier therein, printing devices supported by the carrier, a letter-receiver supported by the carrier, a locking mechanism for said carrier, two coin-receivers having connection with said locking mechanism, and a coin-chute for each of said coin-receivers, for receiving coin of different diameters, substantially as specified.

18. A coin-freed letter posting or stamping machine, comprising a stamping mechanism, a pair of coin-chutes, a coin-receiver for each of said chutes, counterbalanced levers carrying said receivers, type movable into printing position for indicating on an envelop the amount of postage paid therefor, and connections between said type and the levers of the coin-receivers, for moving said type into printing position, substantially as specified.

19. A coin-freed letter posting or stamping machine, comprising a rotary carrier, a successive-numbering device carried thereby, fixed printing-characters supported within the carrier, a movable printing-type adapted to be moved adjacent to said fixed printing-characters, a coin-chute, a coin-receiver, a cam-wheel movable longitudinally of a trunnion on said carrier, means connected with the coin-receiver for causing said longitudinal movement, and connections between said cam and the said movable printing-type, substantially as specified.

20. A coin-freed letter posting or stamping machine, comprising a rotary carrier, a numbering device carried thereby, a coin-actuated lever thereon, a type-bar movable in an opening in said carrier, a lever fulcrumed to the carrier and having a sliding connection with said bar, a link extended through a trunnion of the carrier, a cam having connection with said link and movable on the trunnion, a sliding plate for moving said cam, and connections between the coin-actuated lever and the said sliding plate, whereby said plate may be moved into contact with said cam, substantially as specified.

21. A coin-freed letter posting or stamping machine comprising a rotary carrier and printing devices carried thereby, a coin-actuated releasing device for said carrier, comprising a counterbalanced coin-pan, a coin-tube for receiving a coin from said pan when the same is tilted downward by the coin, a finger movable through an opening in the said pan, for discharging a coin therefrom, and a lever operated by the carrier for moving said finger through the opening in the coin-pan, substantially as specified.

22. In a device of the character described, the combination with the coin-receiving pans, of coin-tubes mounted on a swinging plate, and a coin-ejector movable beneath the tube, for ejecting the coin one at a time from the respective tubes, substantially as specified.

23. The combination with the swinging coin-pans, of the swinging coin-tubes, the ejector-plate movable beneath the said tubes, and a locking device for said ejector adapted to be held out of locking engagement with the ejector by the weight of a coin, substantially as specified.

24. In a machine of the class described, the combination with a rotary carrier and a letter-receiver carried thereby, of locking mechanism therefor, the coin-actuated levers or arms having connections with said locking device, a longitudinally-movable coin-ejector, coin-tubes adapted to receive coin of different denominations, and a swinging plate upon which said coin-tubes are mounted, whereby said tubes may be moved respectively into discharging position over the ejector, substantially as specified.

25. In a machine of the class described, the combination with a rotary carrier for a letter-receiver, of a coin-actuated releasing mechanism for said carriers, the coin-pans, the coin-chutes for discharging coin into said pans, the coin-tubes for receiving coin from the pans, a horizontally-swinging plate upon which the coin-tubes are mounted, an ejector-plate and a shifting device extended to an opening in the front part of the machine-casing for shifting said coin-tubes, substantially as specified.

26. The combination with coin-actuated mechanism, of a coin-chute, an ejector-plate, progressive recording or numbering wheels operated by the movement of said ejector and a strip for receiving impressions from the wheels, substantially as specified.

27. The combination, with the rotary carrier having a printing mechanism and letter-receiver, of coin-actuated releasing mechanism therefor, comprising a coin-pan receiving coin from a chute, a coin-tube for receiving a coin from said pan, an ejector-plate, a numbering mechanism operated by a movement of the ejector-plate, an inking device operated by a movement of the ejector-plate, and a platen operated by a movement of the ejector-plate, substantially as specified.

28. The combination with coin-actuated mechanism, of the two coin-tubes for receiving coin of different denominations, a swinging plate upon which said coin-tubes are mounted, a longitudinally-movable ejector-plate, a rod having connection with the swinging plate, for swinging the coin-tubes in position over the ejector-plate, a printing device operated by the movement of the ejector-plate, a platen operated by the movement of the ejector-plate, a puncturing device carried by the platen, and means for moving said puncturing device into operative position, as and for the purpose specified.

29. The combination, with the coin-tubes and a swinging plate upon which the same are mounted, of a rod for swinging said plate, an ejector-plate, a progressive-numbering device operated by a movement of the ejector-plate, a platen operated by the movement of the ejector-plate, a bar movable in a longitudinal opening in said platen, a pin adapted to be moved outward through a perforation in the front of said platen by the contact of said rod, a spring for holding said rod outward, and means carried by the plate-swinging rod, for moving said rod within the platen for forcing the pin outward, substantially as specified.

30. The combination with a coin-tube, of an ejector-plate, a locking device therefor, operated to release the ejector by the weight of a coin, a progressive-numbering device comprising a series of rotary wheels, a ratchet-wheel on the shaft of one of said wheels, a yielding dog carried by the ejector-plate and adapted to engage said ratchet-wheel, and a printing-pad movable into engagement with the printing device by the movement of the ejector-plate, substantially as specified.

31. The combination, with a coin-tube and the ejector for discharging coin therefrom, of a series of printing-wheels operated by a movement of said ejector, a platen movable by a movement of said ejector, a delivery-roller for a tape upon which figures are to be printed, feed-rollers for moving the tape, and a connection between said rollers and a numbering-wheel for operating the feed-rollers, substantially as specified.

32. The combination, with coin-actuated mechanism and coin-tubes therefor, of an ejector-plate, a series of numbering-disks operated by a movement of said ejector-plate, each of said disks having on its periphery two sets of figures of equal value, the figures of the sets being so arranged with relation to each other that a figure of one set in printing position will be represented by a figure of the same denomination of the other set at another portion of the numbering-wheel, substantially as specified.

33. The combination, with the coin-tubes mounted to swing and the ejector-plate common to both of the coin-tubes, of an outlet forward of said ejector-plate, through which a coin may be discharged, a closure for said outlet, and a receiver-tube adapted to be inserted through the casing to receive a coin discharged from said opening, substantially as specified.

34. The combination with the ejector-plate, the paper-roller and the platen, of a locking device for the ejector-plate normally held out of engagement with the plate by the paper strip extended from the roller, substantially as specified.

DETALMO DI BRAZZA SAVORGNAN.

Witnesses:
JNO. M. RITTER,
CLARENCE R. FERGUSON.